(12) United States Patent
Saisho (10) Patent No.: US 8,508,775 B2
(45) Date of Patent: Aug. 13, 2013

(54) IMAGE PROCESSING WITH BODY REGION IMAGE AND PERIPHERAL REGION IMAGE

(75) Inventor: Kazuya Saisho, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/825,118

(22) Filed: Jun. 28, 2010

(65) Prior Publication Data

US 2011/0069342 A1    Mar. 24, 2011

(30) Foreign Application Priority Data

Sep. 24, 2009 (JP) ................................ 2009-219764

(51) Int. Cl.
*G06F 3/12* (2006.01)
(52) U.S. Cl.
USPC ....................................................... 358/1.15
(58) Field of Classification Search
None
See application file for complete search history.

(56) References Cited

U.S. PATENT DOCUMENTS

2002/0085219 A1*  7/2002  Ramamoorthy ............... 358/1.9

FOREIGN PATENT DOCUMENTS

| EP | 0942588 A2 | 9/1999 |
|---|---|---|
| JP | 2005-198121 A | 7/2005 |

OTHER PUBLICATIONS

European Search Report dated Nov. 16, 2010 in European Patent Application No. 10168959.4.

* cited by examiner

*Primary Examiner* — Jeremiah Bryar
(74) *Attorney, Agent, or Firm* — Fitzpatrick, Cella, Harper & Scinto (57) ABSTRACT

The present invention provides an image processing apparatus that reduces a memory region for image processing and a processing load when transferring image data to image processing unit; and a control method therefor. To accomplish this, the image processing apparatus inputs an image, divides the image input by the input unit, generates a plurality of tile images, separately packetizes a body region image and a peripheral region image, generates a packet of the body region image and a packet of the peripheral region image, and performs control to store the packet of the body region image and the packet of the peripheral region image generated by the second generation unit in the storage unit in association with each other.

13 Claims, 9 Drawing Sheets

IMAGE PROCESSING WITH BODY REGION IMAGE AND PERIPHERAL REGION IMAGE

BACKGROUND OF THE INVENTION

1. Field of the Invention

The present invention relates to an image processing apparatus, a control method therefor and a program.

2. Description of the Related Art

Image processing apparatuses, such as copy machines, facsimile machines and laser printers, execute image processing such as rotation, enlargement/reduction and edge enhancement of input images by storing input image data line by line in a line memory and performing the rotation, various types of filtering, and the like on the lines of stored data. Accordingly, image processing apparatuses generally include an image processing unit having a rotation unit, a filtering unit and the like for page memory and image processing/editing usage. For example, when rotating an input image, an input image for which pixel data has been sequentially written and stored in a predetermined order in a page memory is sequentially read according to the angle and direction in which it is to be rotated. Such image rotation processing is implemented by controlling addresses in a line readout unit. However, implementation of such rotation processing requires a huge page memory that can handle the size of an entire page. Furthermore, with the recent trend toward increased resolution, the memory capacity required for the page memory is increasing, causing cost increases.

As a solution for the above-described problem, a technique has been proposed in which an input page image is divided into tile images and defined in a corresponding data format, and rotation processing or the like is executed on the tile images. In this case, the only memory capacity that is required is one that can handle a divided tile image as the "page" memory used in the rotation processing. Thus more efficient use of memory is possible. However, image processing other than rotation, such as enlargement/reduction or edge enhancement, requires processing of peripheral pixels surrounding a pixel of interest when executing the image processing. Accordingly, if a pixel located on the boundary between tile images is the pixel of interest, for example, calculation cannot be performed with a single tile image. In other words, in order to perform calculation using the peripheral pixels in the case where the pixel of interest is a pixel located on the boundary between tile images, it is necessary to provide a further band memory with a capacity corresponding to the size of the filter calculation, which remains a cause of cost increase especially when attempting to achieve increased resolution.

As a solution for such calculation that refers to peripheral pixels, Japanese Patent Laid-Open No. 2005-198121 proposes a technique in which regions are overlapped when dividing an original image into tile images, so that a pixel of interest located in the vicinity of the boundary can refer to the peripheral pixels of the tile, or of a neighboring tile for processing. It is therefore possible to implement appropriate processing by referring to the pixels of the overlapping region and performing a filter calculation, without requiring a line memory for storing extra peripheral pixels.

However, because this conventional technique adds overlapping regions when dividing an image into tile images, the amount of data of each tile image will be the sum of the amount of image data of the region excluding the overlapping region and the amount of image data of the overlapping region. For example, in the case where a tile image includes 16×16 pixels (256 pixels) and two pixels' worth of peripheral pixels are added in each of the directions, the total amount of data will be 20×20 pixels (400 pixels). In this case, when reading out such tile images, the (buffer) memory is required to have a throughput (required bandwidth) approximately 1.5 times higher than when reading out the amount of data of tile images when overlapping regions are not added.

In addition, whether or not overlapping image data is necessary depends on the content of the image processing. However, in conventional image data formats, tile image data and overlapping image data are combined and compressed, and therefore it is not possible to separate unnecessary overlapping image data. It is possible to separate tile image data and overlapping image data when uncompressed image data is used, but the amount of data per pixel increases as compared to compressed data. Furthermore, when the possible throughput of the system is less than the level required, increased frequency, increased bus width and the like are required as (buffer) memory specifications, causing a further increase in memory cost.

SUMMARY OF THE INVENTION

It is desired to enable realization of an image processing apparatus that reduces a memory region for image processing and a processing load when transferring image data to an image processing unit, and to enable the realization of a control method therefor.

One aspect of the present invention provides an image processing apparatus including a storage unit, the apparatus comprising: an input unit that inputs an image; a first generation unit that divides the image input by the input unit to generate a plurality of tile images; a second generation unit that, for each of the plurality of tile images generated by the first generation unit, separately packetizes a body region image and a peripheral region image, to generate a packet of the body region image and a packet of the peripheral region image; and a control unit that performs control to store the packet of the body region image and the packet of the peripheral region image generated by the second generation unit in the storage unit in association with each other.

Another aspect of the present invention provides a method for controlling an image processing apparatus that has a storage unit, the method comprising: inputting an image; dividing the input image to generate a plurality of tile images; for each of the plurality of generated tile images, separately packetizing a body region image and a peripheral region image to generate a packet of the body region image and a packet of the peripheral region image; and performing control to store the generated packet of the body region image and the generated packet of the peripheral region image in the storage unit in association with each other.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Processing Apparatus

Hereinafter, an embodiment of the present invention will be described with reference to FIGS. 1 to 10. First, an example of a configuration of an image processing apparatus 10 according to the present embodiment will be described with reference to FIG. 1. Here, only primary components used in a preferred embodiment will be described. Accordingly, the image processing apparatus 10 of the present invention may be implemented by including other components or by omitting or replacing some of the components described.

Figure 1:
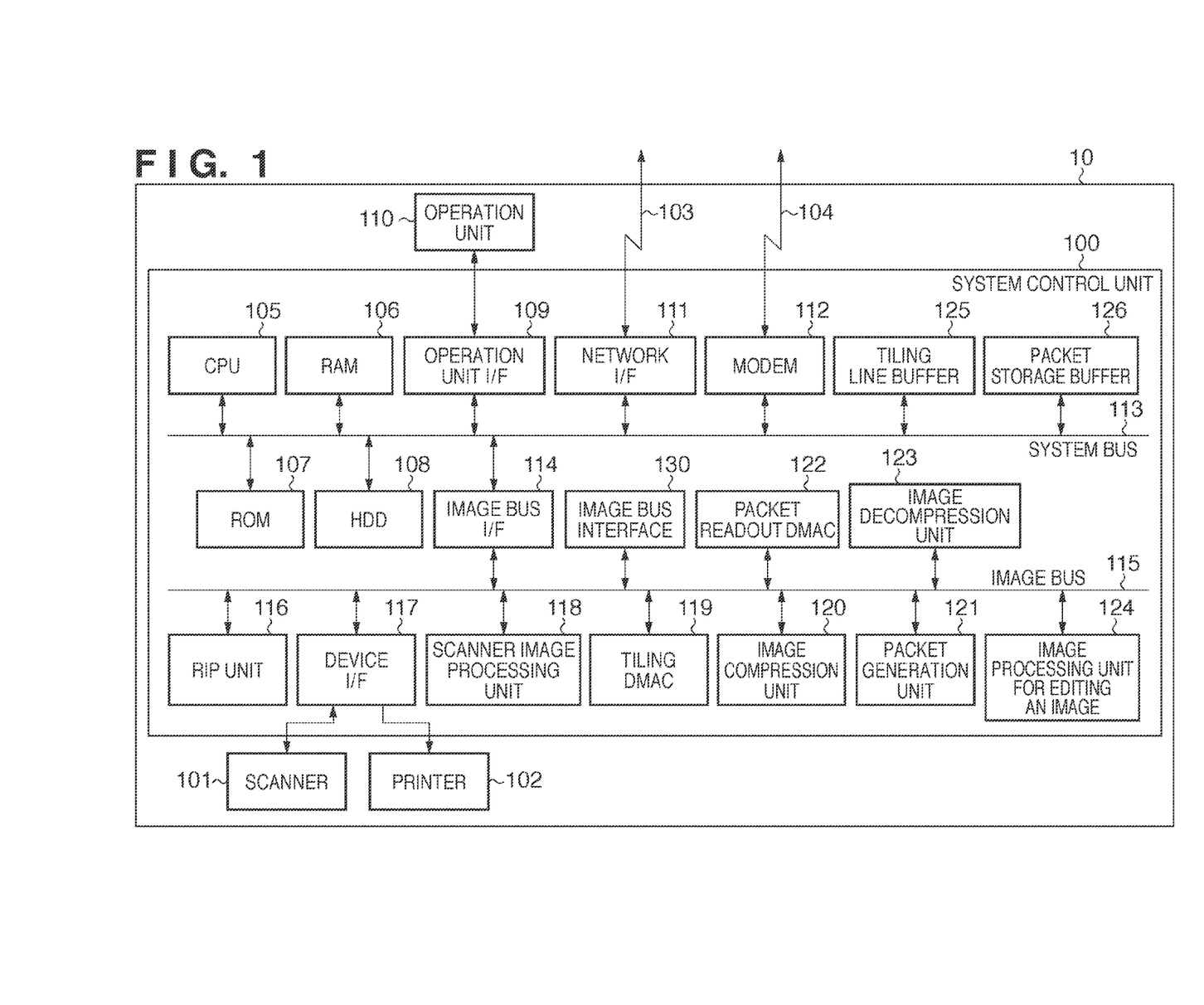
FIG. 1 is a block diagram showing an example of a configuration of an image processing apparatus 10 according to an embodiment of the present invention.

The image processing apparatus 10 includes a system control unit 100, a scanner 101, a printer 102 and an operation unit 110. The system control unit 100 includes a CPU 105, a RAM 106, a ROM 107, a HDD 108, an operation unit I/F 109, a network interface (I/F) 111 in which image data can be input, a modem 112, an image bus I/F 114, a raster image processor (RIP) unit 116, a device I/F 117, a scanner image processing unit 118, a tiling direct memory access controller (DMAC) 119 which is also a first generation means herein, an image compression unit 120, a packet generation unit 121 which is also a second generation means herein, a packet readout DMAC 122, an image decompression unit 123, an image processing unit 124 for editing an image, a tiling line buffer 125, a packet storage buffer 126 and an image bus interface or color management module (CMM) 130. The system control unit 100 is connected to the scanner 101, the printer 102 and the operation unit 110, and controls various operations such as reading out image data, print output, and receiving user operations. Furthermore, the system control unit 100 is connected to a local area network (LAN) 103 and a public line 104, and performs control to input/output image information and device information via the LAN 103.

The CPU 105 is a control unit for controlling the entire image processing apparatus including the system control unit 100. The RAM 106 is a system work memory for the CPU 105 to perform operations, and is also an image memory for temporarily storing input image data. The ROM 107 is a boot ROM in which a system boot program is stored. The HDD 108 is a hard disk drive, which stores system software for various processes, input image data, and the like.

The operation unit I/F 109 is an interface with the operation unit 110 that has a display screen capable of displaying image data and the like, and outputs operation screen data to the operation unit 110. The operation unit I/F 109 notifies the CPU 105 of information input by the operator through the operation unit 110. The network I/F 111 is implemented by, for example, a LAN card or the like, and connects to the LAN 103 and inputs/outputs information to/from external apparatuses. The modem 112 connects to the public line 104, and inputs/outputs information to/from external apparatuses. As shown in FIG. 1, these components are disposed on a system bus 113.

The image bus I/F 114 is an interface for connecting the system bus 113 and an image bus 115 that transfers image data at high speed, and is a bus bridge that converts data structures. The raster image processor (RIP) unit 116 expands page description language (PDL) code and vector data, which will be described later, into images. The device I/F 117 connects the scanner 101 and the printer 102 to the system control unit 100, and performs synchronous/asynchronous conversion processing of image data.

The scanner image processing unit 118 executes various types of image processing, such as correction, processing and editing, on image data input from the scanner 101. The tiling DMAC 119 is an image processing line memory for tiling (i.e. dividing the image into tiles) and reading out input image data stored in the tiling line buffer 125. The image compression unit 120 encodes image data in a predetermined compression format. The packet generation unit 121 packetizes compressed tile image data in accordance with the packet format. The packet readout DMAC 122 reads out data including overlapping image data required by the image processing unit 124 for editing an image from the packet data stored in the packet storage buffer 126. The image decompression unit 123 decodes and decompresses the packetized compressed image data when outputting the data with the printer 102. The image processing unit 124 for editing an image performs various types of image processing, such as rotation, trimming and masking, on image data decompressed by the image decompression unit 123. The CMM 130 is a dedicated hardware module that performs color conversion processing (also referred to as "color space conversion processing") on image data based on profiles and calibration data. As used herein, profiles are information such as functions for converting color image data expressed in a device-dependent color space to a device-independent color space (e.g., Lab or the like). Calibration data is data for modifying color reproduction characteristics of the scanner 101 and the printer 102.

Figure 2:
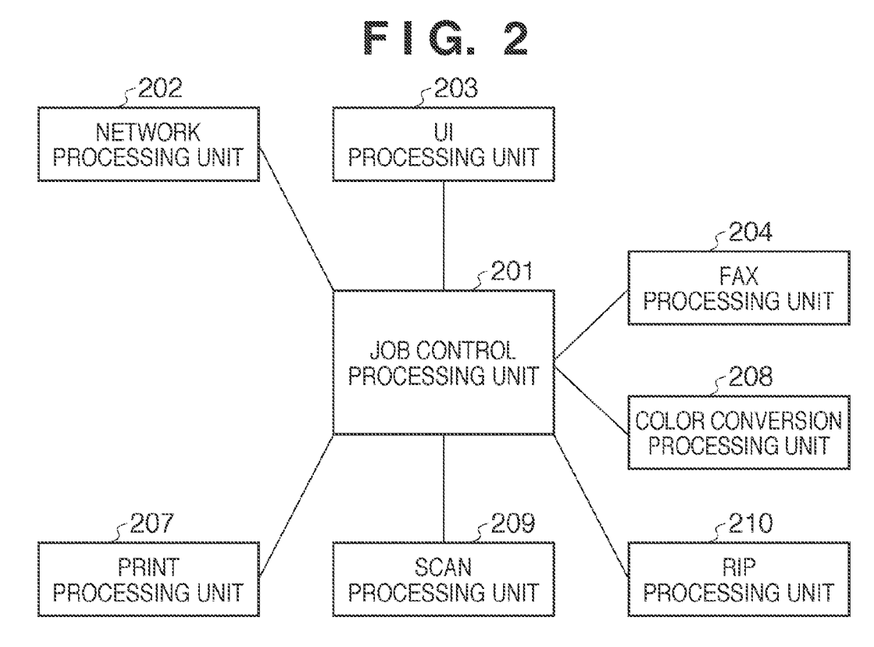
FIG. 2 is a block diagram showing a functional configuration of the image processing apparatus 10 according to the embodiment.

Next, functions that are implemented by the CPU 105 reading a program from a memory such as the ROM 107 and executing the program according to the present embodiment will be described with reference to FIG. 2. The CPU 105 implements a job control processing unit 201, a network processing unit 202, a user interface (UI) processing unit 203, a fax processing unit 204, a print processing unit 207, a color conversion processing unit 208, a scan processing unit 209 and a RIP processing unit 210.

The job control processing unit 201 performs overall control of the functions, and controls all of the jobs generated by the image processing apparatus 10 such as copy, print, scan and fax transmission/reception. The network processing unit 202 controls external communication, which is performed primarily via the network I/F 111, and controls communication with each device disposed on the LAN 103. The network processing unit 202, upon receiving control commands and data from the respective devices of the LAN 103, notifies the job control processing unit 201 of the content thereof. The network processing unit 202 also transmits control commands and data to the respective devices connected to the LAN 103 based on instructions from the job control processing unit 201. The UI processing unit 203 primarily performs control relating to the operation unit 110 and the operation unit I/F 109. Specifically, the UI processing unit 203 notifies the job control processing unit 201 of an operation performed by the operator through the operation unit 110, and controls the content of display on a display screen of the operation unit 110 based on an instruction from the job control processing unit 201.

The fax processing unit 204 controls a fax function. The fax processing unit 204 receives images by fax via the modem 112, performs image processing that is specific to fax images, and then notifies the job control processing unit 201 of the received images. The fax processing unit 204 also transmits, by fax, images designated by the job control processing unit 201 to a designated destination.

The print processing unit 207 controls the image processing unit 124 for editing an image and the printer 102 to print designated images based on an instruction from the job control processing unit 201. The print processing unit 207 acquires image data, image information (the size, color mode, resolution and the like of the image data), layout information (offset, enlargement/reduction, imposition and the like) and output paper information (size, print orientation and the like) from the job control processing unit 201. The print processing unit 207 controls the tiling DMAC 119, the image compression unit 120, the packet generation unit 121, the packet readout DMAC 122, the image decompression unit 123 and the image processing unit 124 for editing an image to perform appropriate image processing on image data. The print processing unit 207 thereafter controls the printer 102 to print the image-processed image data onto designated paper.

The scan processing unit 209 controls the scanner 101 and the scanner image processing unit 118 to read an original document placed on the scanner 101 based on an instruction from the job control processing unit 201. The instruction from the job control processing unit 201 includes color mode information, and the scan processing unit 209 performs processing according to the color mode. In other words, when the color mode has been set to color, the original document is input as color images, and when the color mode has been set to monochrome, the original document is input as monochrome images. When the color mode has been set to "auto", whether the original document is in color or monochrome is determined by pre-scanning, and the original document is scanned again and input as images based on the result of the determination. The scan processing unit 209 scans an original document placed on a document platen provided in the scanner 101, and inputs images as digital data. The color information of input images is provided to the job control processing unit 201. The scan processing unit 209 also controls the scanner image processing unit 118 to perform appropriate image processing, such as compression, on input images, and then notifies the job control processing unit 201 of the image-processed input images.

The color conversion processing unit 208 performs, based on an instruction from the job control processing unit 201, color conversion processing on the instructed images, and notifies the job control processing unit 201 of the color converted images. The job control processing unit 201 notifies the color conversion processing unit 208 of input color space information, output color space information and images on which color conversion is applied. When the output color space provided to the color conversion processing unit 208 is an input device-independent color space (e.g., Lab space), input profile information that is information for converting an input device-dependent input color space (e.g., RGB) to a Lab is also notified. In this case, the color conversion processing unit 208 creates a lookup table (LUT) for mapping an input color space to a Lab space from the input profile, and performs color conversion on input images by using the LUT.

When the input color space provided to the color conversion processing unit 208 is a Lab space, output profile information for converting a Lab space to an output device-dependent output color space is also provided. In this case, the color conversion processing unit 208 creates an LUT for mapping a Lab color space to an output color space from the output profile, and performs color conversion on input images by using the LUT. When both the input color space and output color space provided to the color conversion processing unit 208 are device-dependent color spaces, both an input profile and an output profile are provided. In this case, the color conversion processing unit 208 creates an LUT for directly mapping an input color space to an output color space from the input profile and the output profile, and performs color conversion on input images by using the LUT. In the color conversion processing unit 208, if the CMM 130 is provided inside the device, color conversion is performed by setting generated LUTs in the CMM 130 and using the CMM 130. If, on the other hand, the CMM 130 is not provided, the CPU 105, for example, performs the color conversion processing.

The color conversion processing unit 208 executes color conversion in advance on reference images and thereby stores the time required for color conversion processing when only an input profile has been designated. The color conversion processing unit 208 also stores the time required for color conversion when only an output profile has been designated. The color conversion processing unit 208 also stores the time required for color conversion when an input profile and an output profile have been designated.

The RIP processing unit 210 interprets a page description language (PDL) based on an instruction from the job control processing unit 201, and controls the RIP unit 116 to perform rendering, thereby expanding it to a bitmap image.

Print Operation

A print operation using the above-described configuration according to the present embodiment will be described. As described above, the page description language (PDL) transmitted via the LAN 103 is received by the network I/F 111, and input into the RIP unit 116 by the image bus I/F 114. The RIP unit 116 interprets the transmitted PDL, executes rendering, and thereby expands it in the tiling line buffer 125 as bitmap image data. The memory size of the tiling line buffer 125 used here is the buffer size of a plurality of lines in the main scanning direction.

The expanded image data is divided into tile image data including overlapping regions by the tiling DMAC 119. After that, the tile image data and the overlapping image data are separately read out and encoded in a predetermined image compression format by the image compression unit 120. The encoded tile image data and overlapping image data are packetized by the packet generation unit 121. A packet format is composed of header information in which information of tile image data and overlapping image data regarding the position thereof in a page and the type of image data and the like is written, blocked image data, and overlapping image data.

The packet image data is stored in the packet storage buffer 126, read out by the packet readout DMAC 122 as packet data including necessary overlapping image data, and provided to the image processing unit 124 for editing an image. The packet data is decoded by the image decompression unit 123 via the device I/F 117, and decompressed to restore image data. The restored image data is subjected to desired image processing by the image processing unit 124 for editing an image, and thereafter printed by the printer 102.

Tiling DMAC

Figure 3:
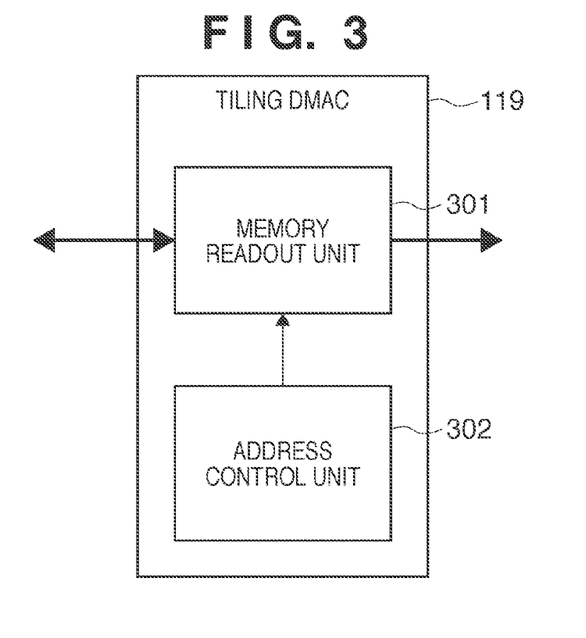
FIG. 3 is a diagram showing an example of an internal configuration of a tiling DMAC 119 according to the embodiment.

An internal configuration of the tiling DMAC 119 will be described next with reference to FIG. 3. The tiling DMAC 119 includes a memory readout unit 301 and an address control unit 302. The address control unit 302 generates an address when reading out image data. The memory readout unit 301 issues a read request transaction to the RAM 106 based on the generated address. This enables desired data to be read out. The data read out from the RAM 106 is stored in the tiling line buffer 125.

Tiling Process

Figure 4:
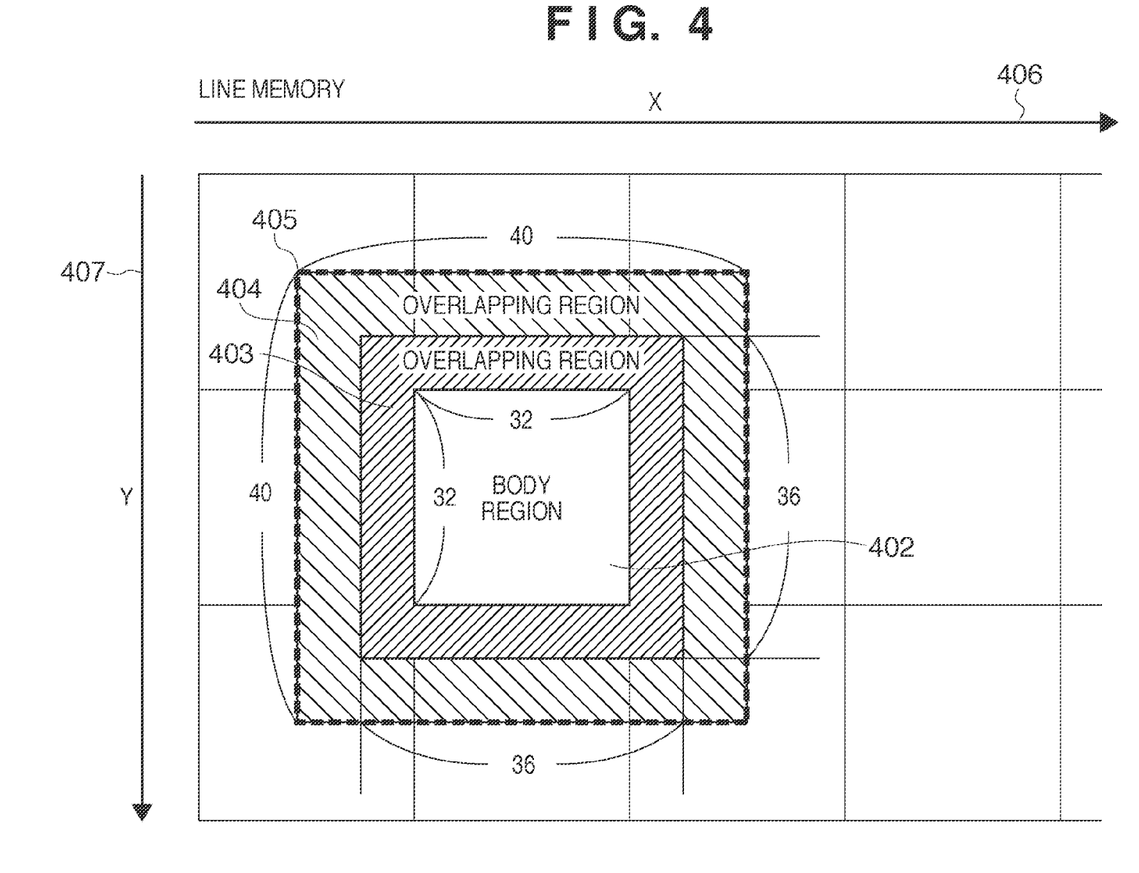
FIG. 4 is a diagram illustrating the tiling of image data according to the embodiment.

A tiling process will be described next with reference to FIGS. 4 and 5. FIG. 4 shows how expanded image data is read into the tiling line buffer 125 when reading out tile data of 40×40 pixels in which four pixels have been twice added to all sides of tile image data of 32×32 pixels as an overlapping tile image. In the present embodiment, as shown in FIG. 4, a 3-line buffer in the main scanning direction is used (illustrated as three rows of squares each with a side 32 pixels long in FIG. 4). With this buffer, the image data of the overlapping region can be read out from the RAM 106 as well.

A tile image region (block or body region) 402 denotes a portion of the image that is referred to as a body region of the tile; i.e. one that includes image data of a predetermined "body region" size with no image data from an overlapping region. Reference numerals 403 and 404 denote overlapping regions. A dotted region 405 denotes a tile portion including the tile image region 402 and the overlapping regions 403 and 404. The overlapping region 403 is a data region directly referred to by the actual tile image region 402. On the other hand, the overlapping region 404 is a data region referred to by the overlapping region 403. An arrow 406 indicates the main scanning direction (X coordinate axis), and an arrow 407 indicates the sub-scanning direction (Y coordinate axis). In the present embodiment, three lines' worth of image data in the main scanning direction are read into the tiling line buffer 125, and the image data of the tile image region and that of the overlapping region that is necessary for image processing are read into the RAM 106 by the packet readout DMAC 122. In this manner, the image processing apparatus 10 divides image data into a plurality of tile images.

Figure 5:
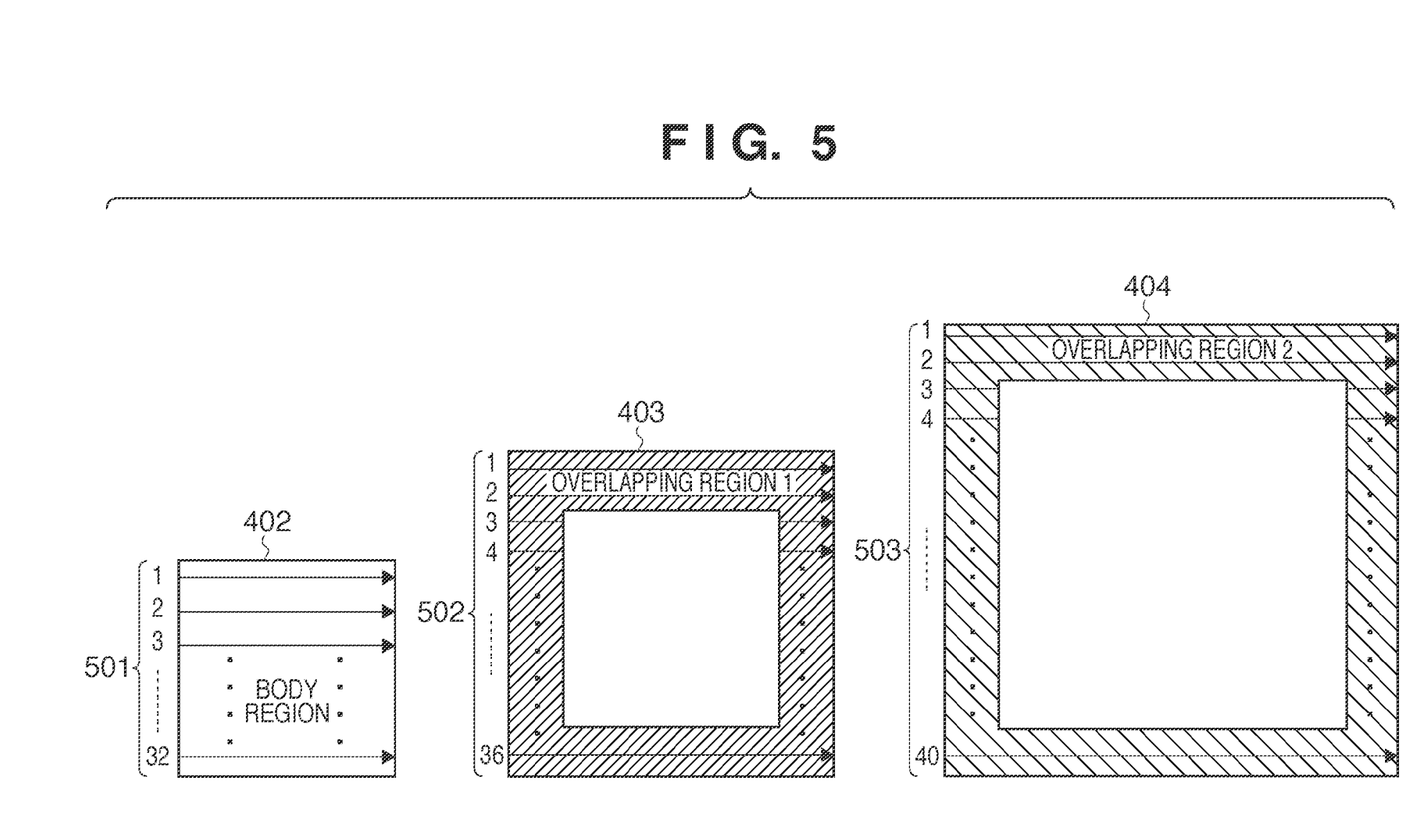
FIG. 5 is a diagram illustrating a procedure for reading out tile image data from a tiling line buffer 125 according to the embodiment.

FIG. 5 shows a procedure for reading out image data from the tiling line buffer 125 in the order of the tile image region 402, the first overlapping region 403 and the second overlapping region 404. In FIG. 5, reference numerals 501, 502 and 503 indicate the order in which the image data of the respective regions is read out line by line. The address control unit 302 first generates address information for accessing the 32×32 actual tile image region 402 in the order indicated by 501, namely by lines of pixels 1 to 32. Next, the address control unit 302 generates address information for accessing the overlapping regions 403 and 404 in the orders indicated by 502 and 503, respectively, namely by lines of pixels 1 to 36 and 1 to 40 respectively. After that, the memory readout unit 301 separately reads out the data of the respective image regions from the tiling line buffer 125 in accordance with the generated address information. The read body image data and the respective overlapping image data are separately encoded by the image compression unit 120.

Packet Data

Next, packet data according to the present embodiment will be described with reference FIGS. 6 and 7. A packet data format will be described first with reference to FIG. 6. The packet 601 generated by the packet generation unit 121 includes an encoded block region and an encoded overlapping region that corresponds to the block region. Specifically, the packet 601 includes header information 602, encoded actual tile image data 603 and encoded overlapping image data 604. The overlapping image data 604 includes the image data of the overlapping regions 403 (Overlap1) and 404 (Overlap2). The packet generation unit 121 generates a packet 601 for each tile image in this packet format, and stores the generated packets 601 in the packet storage buffer 126. In the packet storage buffer 126, the packets are stored densely without any spacing between packets, starting from an address value of 0.

Figure 6:
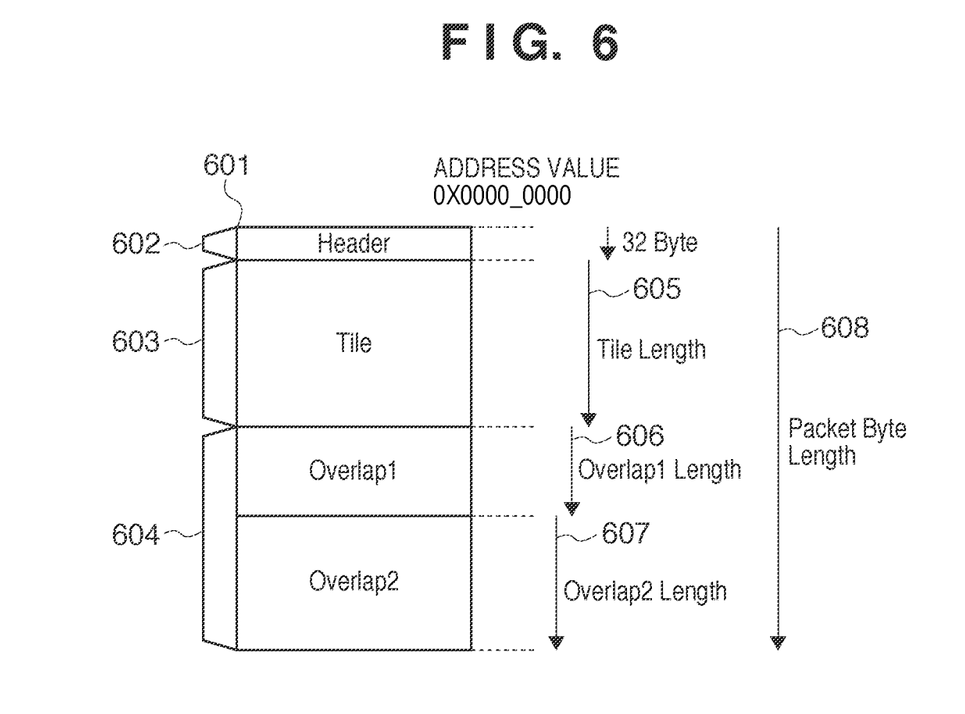
FIG. 6 is a diagram showing a format of packet data according to the embodiment.
Figure 7:
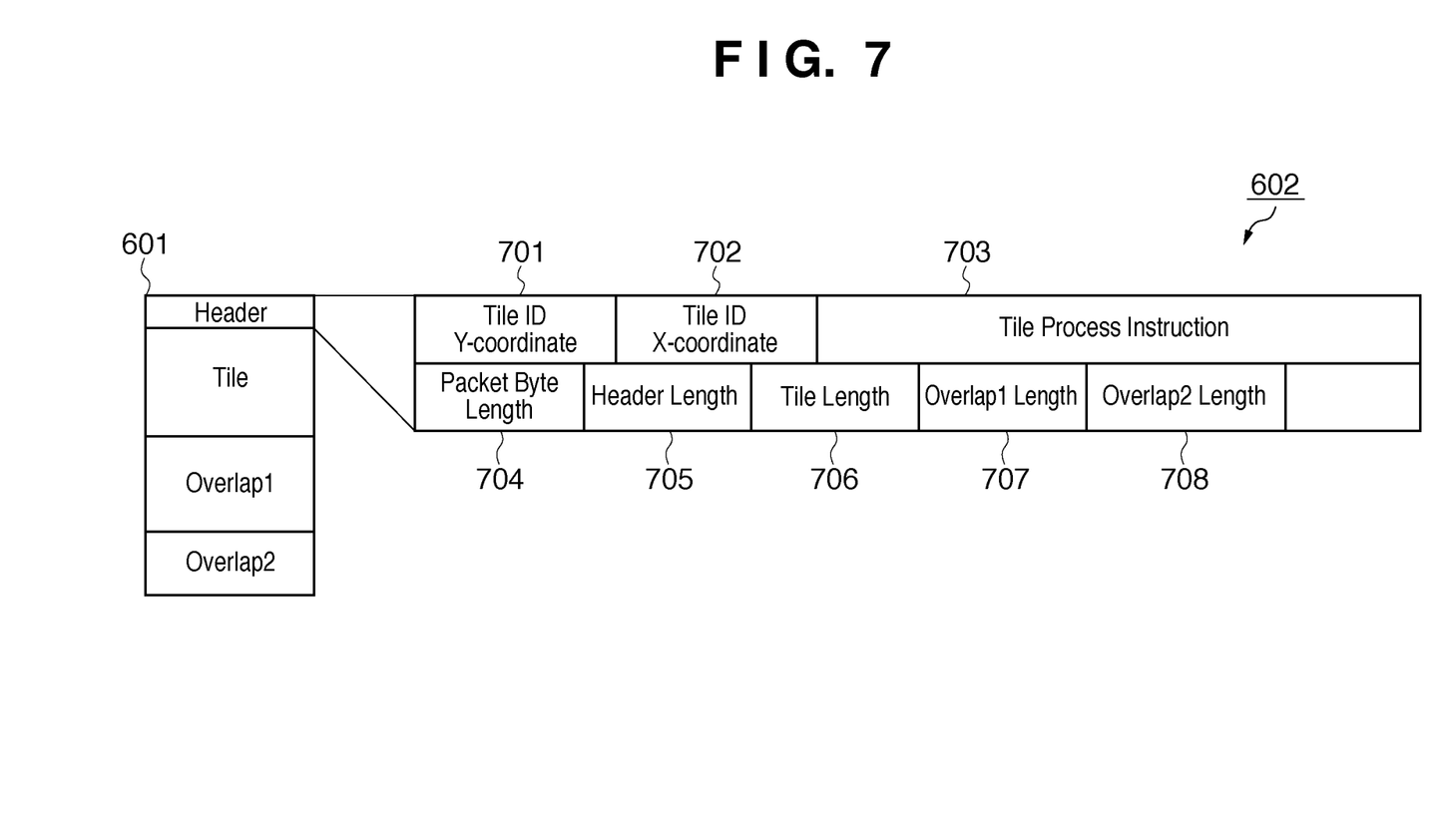
FIG. 7 is a diagram showing a header format of the packet data according to the embodiment.

FIG. 7 shows a format of the header information 602 of the packet 601. In the header information 602, information regarding body image data and overlapping image data is defined. In the present embodiment, the size of the header information 602 is 32 bytes (as shown in FIG. 6). In Tile ID-Y-coordinate 701 and Tile ID-X-coordinate 702, Y coordinates and X coordinates of the body image data in a page are defined, respectively. Tile Process Instruction 703 indicates image processing modules to which the body image data is transferred.

Tile Length 706 indicates an address area width 605 of the body image data within the packet format as shown in FIG. 6. Overlap1 Length 707 and Overlap2 Length 708 indicate address area widths 606 and 607 of the overlapping image data of the respective regions within the packet format. Header Length 705 indicates an address area width (32 bytes in this example) of the header information 602 within the packet format. Packet Byte Length 704 indicates an address area width 608 of the packet 601. The value of Packet Byte Length 704 is the sum of Header Length 705 (32 bytes), Tile Length 706, Overlap1 Length 707 and Overlap2 Length 708. These values are determined when image data is encoded by the image compression unit 120, and written into the header information 602.

As described above, in the present embodiment, a plurality of overlapping regions 403 and 404 are defined for a single tile image region 402. Furthermore, in the present embodiment, a divided tile image region 402 and a plurality of overlapping regions 403 and 404 are separately encoded and packetized. Accordingly, the image processing apparatus 10 of the present embodiment can, according to the image processing to be executed on the original image, transfer overlapping regions that are necessary for the image processing together with tile image regions 402 to the image processing unit 124 for editing an image. The image processing apparatus 10 therefore can transfer the minimum image data required for image processing to the image processing unit 124 for editing an image, as well as reducing the transfer bus width and the processing load on the image data transfer and image processing.

Packet Data Reading Out Process

Figure 8:
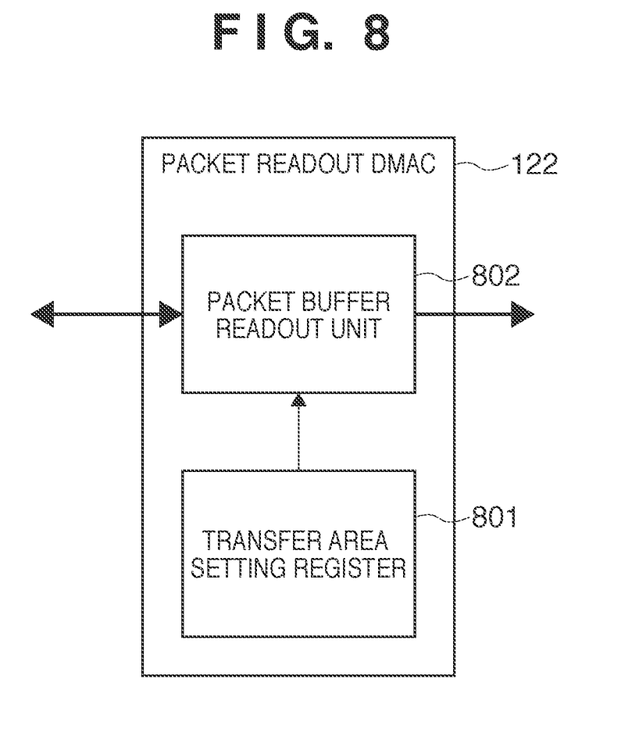
FIG. 8 is a diagram showing packet data stored in a packet storage buffer 126 according to the embodiment.

A process for reading out packet data stored in the packet storage buffer 126 will be described next with reference to FIGS. 8 and 9. The packet data reading out process is controlled by the packet readout DMAC 122. As shown in FIG. 8, the packet readout DMAC 122 includes a transfer area setting register 801 and a packet buffer readout unit 802. The transfer area setting register 801 is a two-bit register for setting a transfer area of image data. The transfer area setting register 801 can be set to a value of 0, 1 or 2. When the transfer area setting register 801 is set to a value of 2, the packet buffer readout unit 802 reads out the image data of the encoded actual tile image region 402 and that of the two-line overlapping regions 403 and 404. When the transfer area setting register 801 is set to a value of 1, the packet buffer readout unit 802 reads out the image data of the encoded actual tile image region 402 and that of the two-line overlapping region 403. When the transfer area setting register 801 is set to a value of 0, the packet buffer readout unit 802 reads out only the image data of the encoded actual tile image region 402.

As described above, body image data and necessary overlap data are extracted from the packet storage buffer 126 based on the value of each Length within the header and the value of the transfer area setting register 801. The extracted data is transferred via the image decompression unit 123 to the image processing unit 124. Of the two (or more) overlapping image data 604 of the packet 601, the overlapping region required by the image processing unit 124 varies depending on the processing performed by the image processing unit 124. Accordingly, a procedure for processing packet image data by the image processing unit 124 is written into Tile Process Instruction 703 in accordance with the processing performed on the image data.

Figure 9:
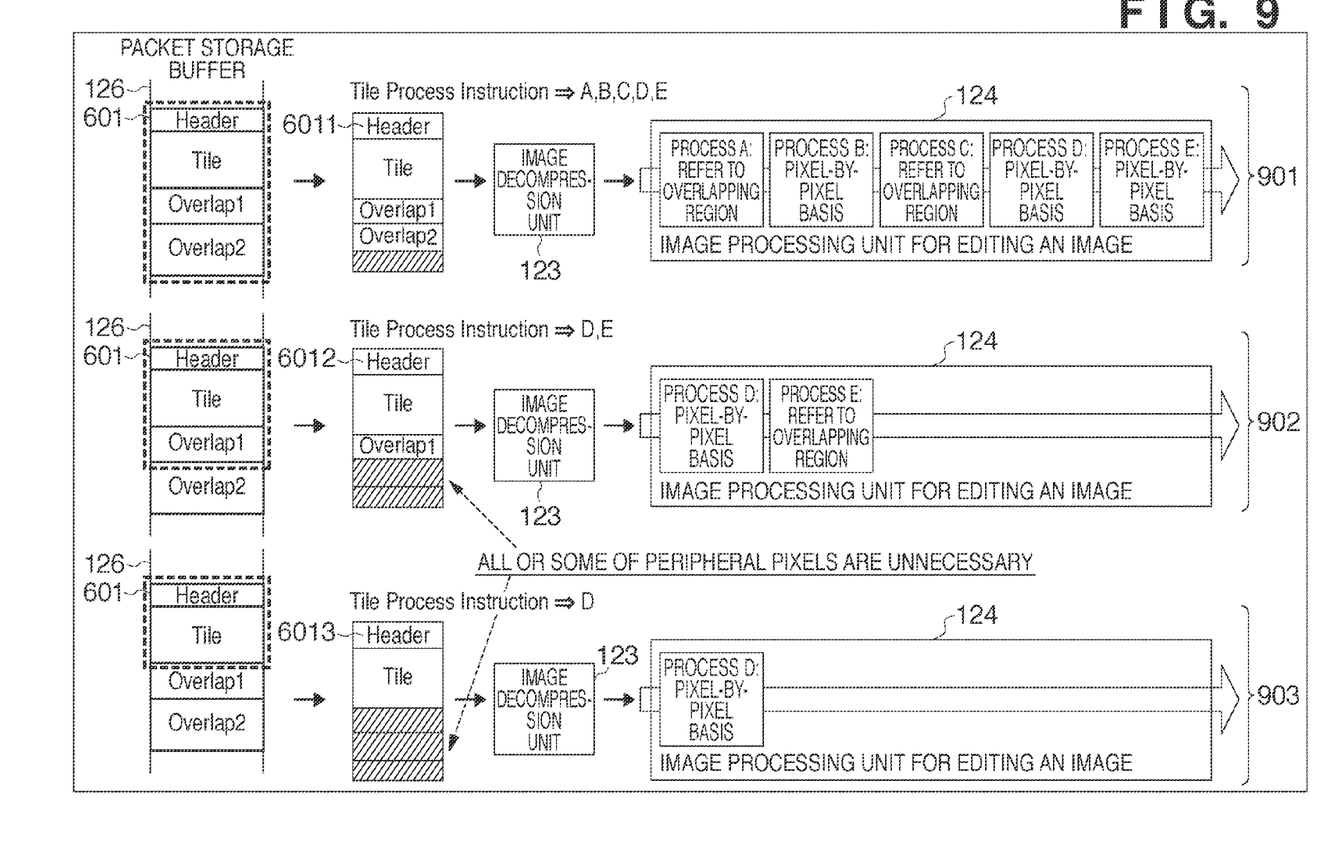
FIG. 9 is a diagram illustrating a procedure for reading out a tile image including overlapping regions of an image processing flow according to the embodiment.

Specifically, as shown in FIG. 9, the letters A, B, C, D and E representing the types of image processing modules included in the image processing unit 124 are written in Tile Process Instruction 703 in the order of processing. Here, an example will be described in which the image processing unit 124 includes image processing modules A to E, but the present invention is not limited thereto, and the image processing unit 124 for editing an image may further include other image processing modules. Each image processing module is configured as described below.

An image processing module A performs screen processing, and refers to two lines each of a tile region and an overlapping region. An image processing module B performs color space conversion processing, and refers only to a tile region. An image processing module C performs a smoothing process, and refers to two lines each of a tile region and an overlapping region. An image processing module D performs resolution conversion processing, and refers only to a tile region. An image processing module E performs a trimming process, and refers only to a tile region.

A pattern 901 shown in FIG. 9 indicates a process in which packet data is processed by the image processing modules A, B, C, D and E provided in the image processing unit 124. The image processing modules A and C perform screen processing and a smoothing process, and refer to, by two lines each, an overlapping region. Accordingly, the packet readout DMAC 122 needs to read out, from the packet 601, the header information 602, the image data of the encoded actual tile image region 402, and the image data of the two-line overlapping regions 403 and 404. Thus, the transfer area setting register 801 is set to 2. In response, the packet readout DMAC 122 refers to Header Length 705, Tile Length 706, Overlap1 Length 707 and Overlap2 Length 708 from the header. After that, the packet readout DMAC 122 reads out the data of a region corresponding to the total of the values of the referred Header Length 705, Tile Length 706, Overlap1 Length 707 and Overlap2 Length 708 from the packet storage buffer 126. The total read data 6011 is transferred to the image decompression unit 123. The image decompression unit 123 decodes the encoded data, and transfers the data to the image processing unit 124.

A pattern 902 shown in FIG. 9 indicates a process in which packet data is processed by the image processing modules D and E of the image processing unit 124. The image processing module E refers to a one-line overlapping region to perform screen processing. Accordingly, the packet readout DMAC 122 need only to read out the header information 602, the image data of the encoded actual tile image region 402, and the image data of the one-line overlapping region 403. Thus, the transfer area setting register 801 is set to 1. In response, the packet readout DMAC 122 refers to Header Length 705, Tile Length 706 and Overlap1 Length 707 from the header. After that, the packet readout DMAC 122 reads out the data of a region corresponding to the total of the values of the referred Header Length 705, Tile Length 706 and Overlap1 Length 707 from the packet storage buffer 126. Read data 6012 is transferred to the image decompression unit 123. The image decompression unit 123 decodes the encoded data, and transfers the data to the image processing unit 124 for editing an image.

A pattern 903 shown in FIG. 9 indicates a process in which packet data is processed by the image processing module D of the image processing unit 124 for editing an image. Because the image processing modules that refer to overlapping regions are not involved, the packet readout DMAC 122 needs to read out the header information 602 and the encoded actual tile image region 402. Accordingly, the transfer area setting register 801 is set to 0. In response, the packet readout DMAC 122 refers to Packet Byte Length 704, Header Length 705 and Tile Length 706 from the header. After that, the packet readout DMAC 122 reads out the data of a region corresponding to the total of the values of the referred Header Length 705 and Tile Length 706 from the packet storage buffer 126. Read data 6013 is transferred to the image decompression unit 123. The image decompression unit 123 decodes the encoded data, and transfers the data to the image processing unit 124 for editing an image.

Print Operation

Figure 10:
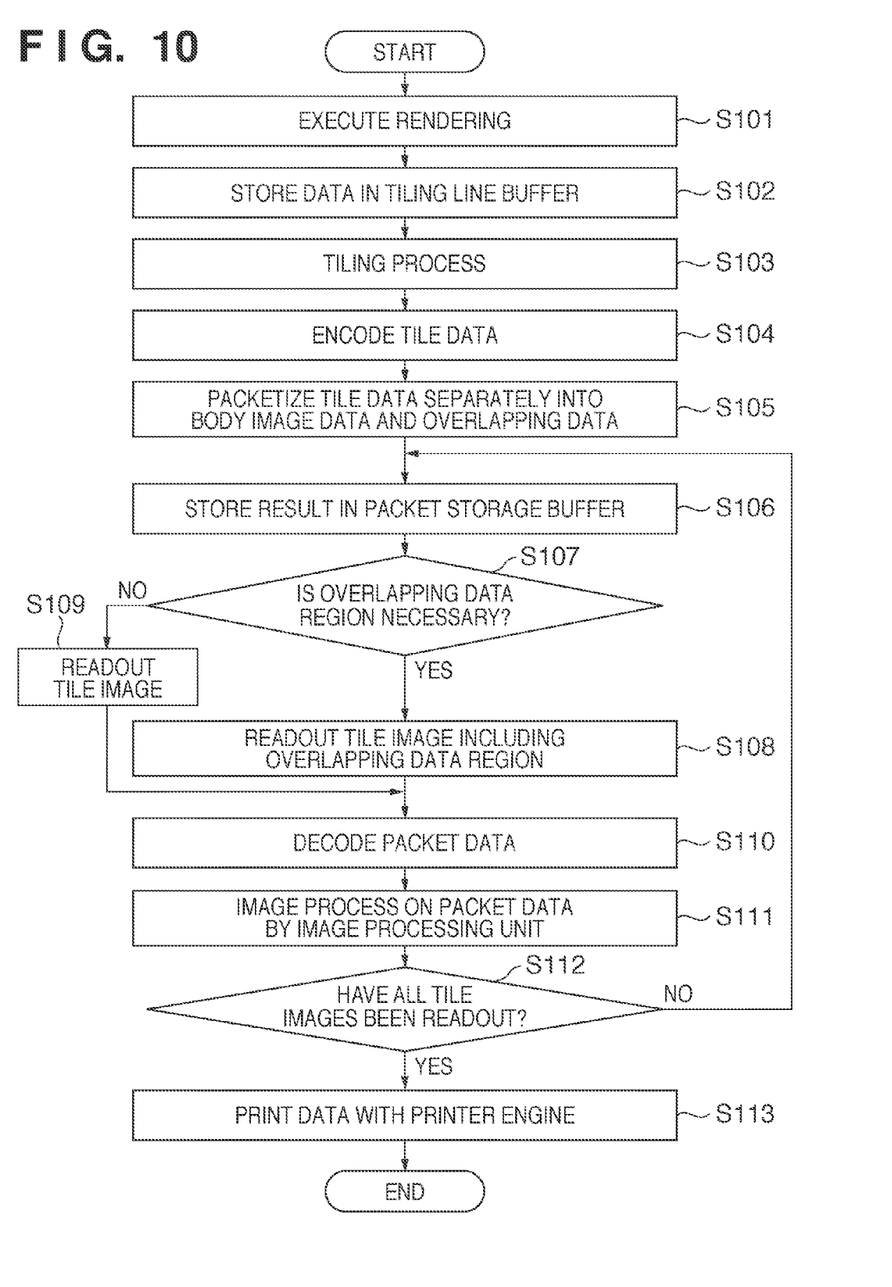
FIG. 10 is a flowchart showing a print operation processing procedure according to the embodiment.

A print operation processing procedure will be described next with reference to FIG. 10. Overall control of the processing described below is performed by the CPU 105 shown in FIG. 2. First, in S101, the CPU 105 receives a page description language (PDL) that has been transmitted by the network I/F 111 via the LAN 103, and inputs it into the RIP unit 116 via the image bus I/F 114. The RIP unit 116 interprets the transmitted PDL and executes rendering. Specifically, the process of S101 is controlled by the job control processing unit 201, the network processing unit 202 and the RIP processing unit 210. The process starting from S102 is controlled primarily by the print processing unit 207.

Next, in S102, the CPU 105 stores the image data that has been rendered and expanded to bitmap image data in the RAM 106. Subsequently, in S103, the CPU 105 divides the stored image data into tile image data including overlapping regions using the tiling DMAC 119, and separately stores the data of the actual tile image region 402 and that of the respective overlapping regions 403 and 404 in the RAM 106. After that, in S104, the CPU 105 causes the image compression unit 120 to encode the stored tile image data in a predetermined image compression format.

Next, in S105, the packet generation unit 121 packetizes the compressed tile image data in accordance with the packet format, and stores the result in the packet storage buffer 126 in S106. Subsequently, in S107, the packet readout DMAC 122 determines whether or not an overlapping data region is necessary for the image processing to be executed in accordance with the register value of the transfer area setting register 801. If an overlapping data region is necessary, the process advances to S108. If it is not necessary, the process advances to S109.

In S108, the packet readout DMAC 122 reads out packet data including the data of a necessary overlapping region in accordance with the value of the transfer area setting register 801, and the process advances to S110. On the other hand, in S109, the packet readout DMAC 122 reads out packet data without overlapping region data in accordance with the value of the transfer area setting register 801, and the process advances to S110.

In S110, the image decompression unit 123 decodes the read packet data. In S111, the image processing unit 124 for editing an image executes predetermined image processing on the image-decompressed packet data. Subsequently, in S112, the CPU 105 determines whether or not all tile images have been read out. If all tile images have not been read out, the process returns to S106. If all tile images have been read out, the process advances to S113. In S113, the CPU 105 causes the printer 102 to print the image-processed packet data.

As described above, the image processing apparatus of the present embodiment divides an original image into a plurality of block regions and overlapping regions for the respective block regions including a predetermined number of peripheral pixels. In addition, the image processing apparatus separately encodes and packetizes the divided block regions and the overlapping regions. Furthermore, the image processing apparatus determines whether or not an overlapping region is necessary according to the image processing to be executed, and transfers the block regions and necessary overlapping regions to the image processing unit. In this manner, the image processing apparatus of the present invention divides an original image into block regions and performs image processing, whereby it is possible to reduce a memory region for image processing, specifically, the size of the line buffer, as well as reducing cost. Furthermore, because the image processing apparatus of the present invention transfers the image data of overlapping regions to the image processing unit together with the image data of the block regions if required in the image processing, it is possible to reduce the data transfer bus width and the processing load on the image processing.

It should be noted that the present invention is not limited to the above-described embodiment and can be modified in various ways. For example, the image processing apparatus of the present invention may obtain a plurality of overlapping regions for each block region from the original image. In other words, an overlapping region may be more finely divided. The image processing apparatus of the present invention can thereby transfer minimum required overlapping region image data to the image processing unit together with the block region image data.

In the above embodiment, a method for transferring image data to the image processing unit 124 for editing an image provided in the image processing apparatus 10 has been described. However, the present invention is not limited thereto, and can be implemented as an image processing system in which image data is transferred to an image processing unit provided in an external apparatus connected via a network with the same transfer method as described in the above embodiment.

Other Embodiments

Aspects of the present invention can also be realized by a computer of a system or apparatus (or devices such as a CPU or microprocessor (MPU)) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-219764 filed on Sep. 24, 2009, which is hereby incorporated by reference herein in its entirety.

What is claimed is:

1. An image processing apparatus including a storage unit, the apparatus comprising:
   an input unit that inputs an image;
   a first generation unit that divides the image input by the input unit to generate a plurality of tile images;
   a second generation unit that, for each of the plurality of tile images generated by the first generation unit, separately packetizes a body region image and a peripheral region image, to generate a packet of the body region image and a packet of the peripheral region image;
   a control unit that performs control to store the packet of the body region image and the packet of the peripheral region image generated by the second generation unit in the storage unit in association with each other;
   a determining unit that determines whether or not to use the peripheral region image when executing image processing using the body region image; and
   a readout unit that, if the determining unit has determined to use the peripheral region image, reads out the packet of the body region image and the packet of the peripheral region image from the storage unit when executing image processing using the body region image, and that, if the determining unit has determined to not use the peripheral region image, reads out the packet of the body region image from the storage unit without reading the packet of the peripheral region image from the storage unit when executing image processing using the body region image.

2. The image processing apparatus according to claim 1, wherein the second generation unit is configured separately to packetize a plurality of types of peripheral region images to generate packets of the plurality of types of peripheral region images.

3. The image processing apparatus according to claim 1, wherein the determining unit determines whether or not to use the peripheral region image when executing image processing using the body region image, based on a kind of image processing to be executed for a packet read by the readout unit.

4. The image processing apparatus according to claim 1, further comprising:
   an image processing unit that executes image processing for a packet read by the readout unit.

5. The image processing apparatus according to claim 1, further comprising:
   a printing unit that executes printing by using a packet read by the readout unit.

6. An image processing apparatus including a storage unit, the apparatus comprising:
   an input unit that inputs an image;
   a first generation unit that divides the image input by the input unit to generate a plurality of tile images;
   a second generation unit that, for each of the plurality of tile images generated by the first generation unit, separately packetizes a body region image and a plurality of types of peripheral region images, to generate a packet of the body region image and packets of the plurality of types of peripheral region images;

a control unit that performs control to store the packet of the body region image and the packet of the peripheral region image generated by the second generation unit in the storage unit in association with each other;

a specifying unit that specifies a type of peripheral region image to be used when executing image processing using the body region image; and a readout unit that reads out the packet of the body region image and a packet of the type of peripheral region image specified by the specifying unit from the storage unit, without reading out a packet of a type of peripheral region image that was not specified by the specifying unit from the storage unit, when executing image processing using the body region image.

7. The image processing apparatus according to claim 6, wherein the specifying unit specifies a type of peripheral region image to be used when executing image processing using the body region image, based on a kind of image processing to be executed for a packet read by the readout unit.

8. The image processing apparatus according to claim 6, further comprising:
an image processing unit that executes image processing for a packet read by the readout unit.

9. The image processing apparatus according to claim 6, further comprising:
a printing unit that executes printing by using a packet read by the readout unit.

10. An image processing method comprising:
an input step of inputting an image;
a first generation step of dividing the image input by the input step to generate a plurality of tile images;
a second generation step of, for each of the plurality of tile images generated by the first generation step, separately packetizing a body region image and a peripheral region image, to generate a packet of the body region image and a packet of the peripheral region image;
a control step of controlling to store the packet of the body region image and the packet of the peripheral region image generated by the second generation step in a storage unit in association with each other;
a determining step of determining whether or not to use the peripheral region image when executing image processing using the body region image; and
a readout step of, if the determining step has determined to use the peripheral region image, reading out the packet of the body region image and the packet of the peripheral region image from the storage unit when executing image processing using the body region image, and of, if the determining step has determined to not use the peripheral region image, reading out the packet of the body region image from the storage unit without reading the packet of the peripheral region image from the storage unit when executing image processing using the body region image.

11. An image processing method comprising:
an input step of inputting an image;
a first generation step of dividing the image input by the input step to generate a plurality of tile images;
a second generation step of, for each of the plurality of tile images generated by the first generation step, separately packetizing a body region image and a plurality of types of peripheral region images, to generate a packet of the body region image and packets of the plurality of types of peripheral region images;
a control step of controlling to store the packet of the body region image and the packets of the peripheral region image generated by the second generation step in a storage unit in association with each other;

a specifying step of specifying a type of peripheral region image to be used when executing image processing using the body region image; and a readout step of reading out the packet of the body region image and a packet of the type of peripheral region image specified by the specifying step from the storage unit, without reading out a packet of a type of peripheral region image that was not specified by the specifying step from the storage unit, when executing image processing using the body region image.

12. A non-transitory computer-readable storage medium storing a computer program which, when executed, causes a computer to perform:
an input step of inputting an image;
a first generation step of dividing the image input by the input step to generate a plurality of tile images;
a second generation step of, for each of the plurality of tile images generated by the first generation step, separately packetizing a body region image and a peripheral region image, to generate a packet of the body region image and a packet of the peripheral region image;
a control step of controlling to store the packet of the body region image and the packet of the peripheral region image generated by the second generation step in a storage unit in association with each other;
a determining step of determining whether or not to use the peripheral region image when executing image processing using the body region image; and
a readout step of, if the determining step has determined to use the peripheral region image, reading out the packet of the body region image and the packet of the peripheral region image from the storage unit when executing image processing using the body region image, and of, if the determining step has determined to not use the peripheral region image, reading out the packet of the body region image from the storage unit without reading the packet of the peripheral region image from the storage unit when executing image processing using the body region image.

13. A non-transitory computer-readable storage medium storing a computer program which, when executed, causes a computer to perform:
an input step of inputting an image;
a first generation step of dividing the image input by the input step to generate a plurality of tile images;
a second generation step of, for each of the plurality of tile images generated by the first generation step, separately packetizing a body region image and a plurality of types of peripheral region images, to generate a packet of the body region image and packets of the plurality of types of peripheral region images;
a control step of controlling to store the packet of the body region image and the packets of the peripheral region image generated by the second generation step in a storage unit in association with each other;
a specifying step of specifying a type of peripheral region image to be used when executing image processing using the body region image; and
a readout step of reading out the packet of the body region image and a packet of the type of peripheral region image specified by the specifying step from the storage unit, without reading out a packet of a type of peripheral region image that was not specified by the specifying step from the storage unit, when executing image processing using the body region image.

* * * * *